Feb. 20, 1923.

R. D. OLHAUSEN

RAT TRAP

Filed Apr. 10, 1922

Inventor
R. D. Olhausen
by Wilkinson & Giusta
Attorneys

Feb. 20, 1923.
R. D. OLHAUSEN
RAT TRAP
Filed Apr. 10, 1922
1,446,268
2 sheets-sheet 2
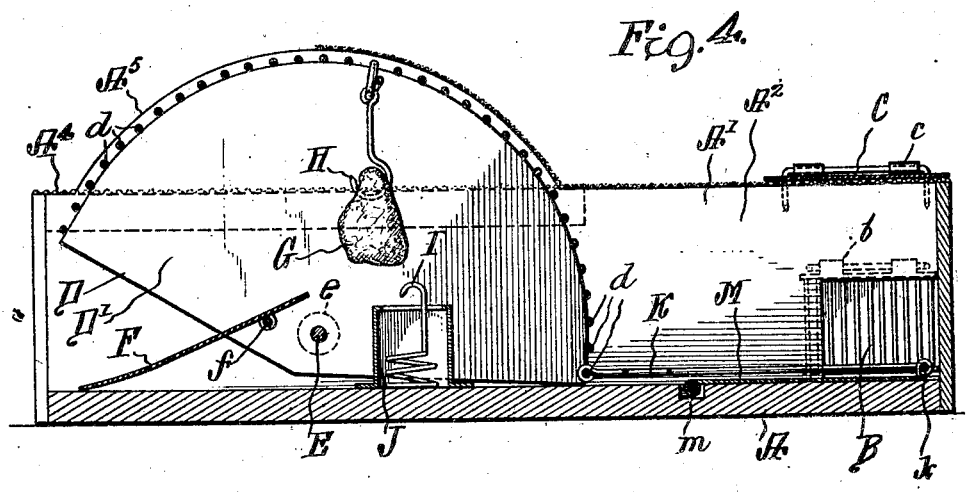
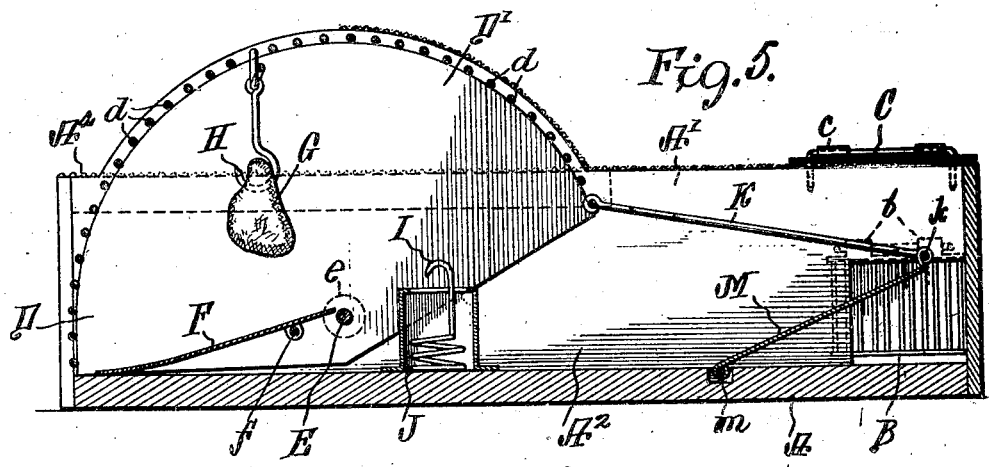
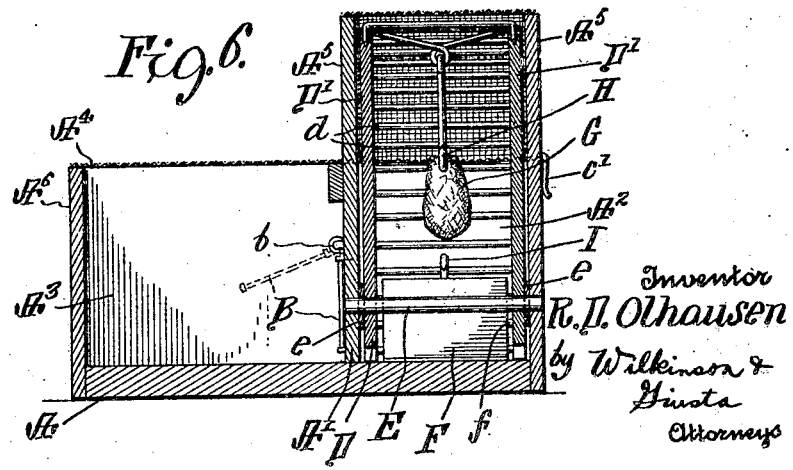

Patented Feb. 20, 1923.

1,446,268

UNITED STATES PATENT OFFICE.

RIVERS D. OLHAUSEN, OF RIDGELY, TENNESSEE.

RAT TRAP.

Application filed April 10, 1922. Serial No. 551,151.

*To all whom it may concern:*

Be it known that I, RIVERS D. OLHAUSEN, a citizen of the United States, residing at Ridgely, in the county of Lake and State of Tennessee, have invented certain new and useful Improvements in Rat Traps; and I do hereby declare the following to be a full, clear, and exact description of the invention, such as will enable others skilled in the art to which it appertains to make and use the same.

My invention relates to improvements in traps for rats or other small animals, in which it is desired to capture the animal alive without mutilating the same.

The invention relates to that type of trap which is provided with a trapping compartment and with a waiting room or imprisoning compartment, and it is so arranged that a number of animals may be caught and held prisoners in the same trap; and the trap automatically re-sets itself after each animal moves from the trapping compartment to the waiting room.

My invention will be more fully understood after reference to the accompanying drawings, in which like parts are indicated by similar reference symbols throughout the several views, and in which:—

Figure 4 shows a section along the line 4—5 of Fig. 1, and looking in the direction of the arrows, the parts being shown in the position when the trap is set.

Figure 5 is a similar view to Fig. 4, but shows the parts in the position they assume in the first stage of trapping the animal; and Figure 6 shows a section along the line 6—6 of Fig. 1, and looking in the direction of the arrows.

A represents a box which may be made of wood faced with metal, wire, or other suitable material, which is divided by the partition $A'$ into two compartments $A^2$ in which the animal is trapped and $A^3$ the waiting room into which the animal escapes from the trapping compartment and is held prisoner, as will be hereinafter described.

Figure 1:
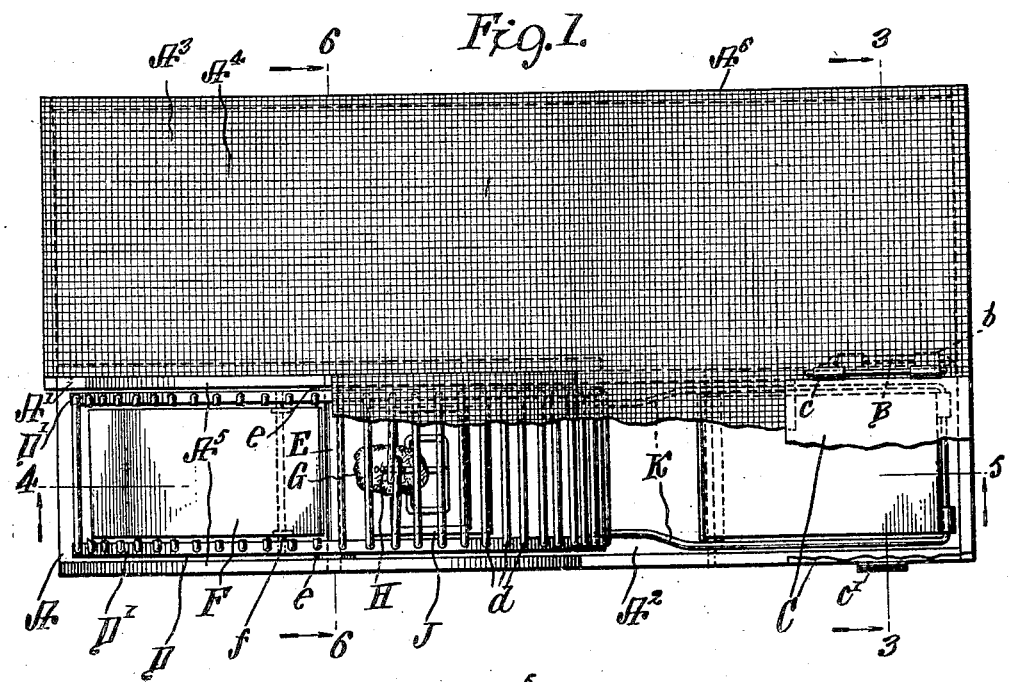
Figure 1 is a plan view of the trap complete, parts being shown as broken away.
Figure 2:
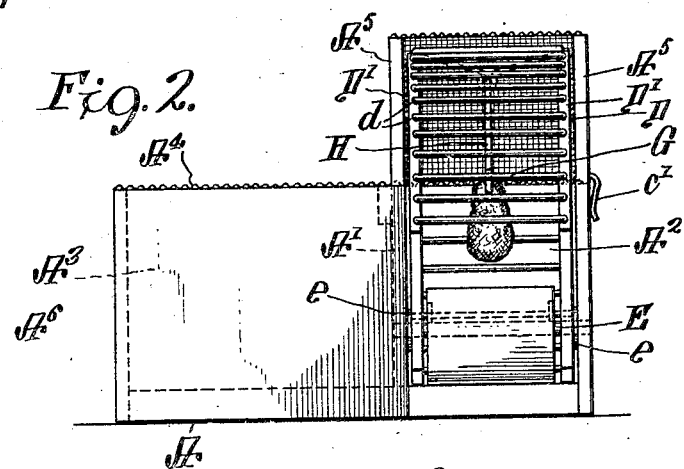
Figure 2 is an end view as seen from the left of Fig. 1, with the trap set.
Figure 3:
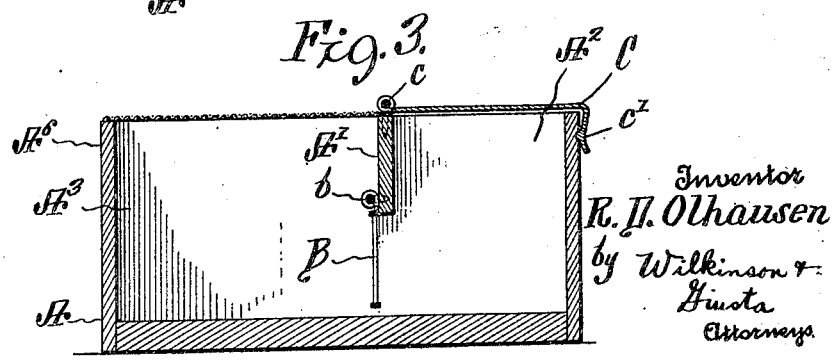
Figure 3 shows a section along the line 3—3 of Fig. 1, and looking in the direction of the arrows.

These two compartments are connected together by a swinging door B, hinged, as at $b$, to the partition $A'$, and the rear end of the trapping compartment is provided with a delivery door C which may be hinged to the partition $A'$, as at $c$, and may be provided with any suitable fastening means, as $c'$, see Fig. 1.

The partition $A'$ is preferably made of opaque material so that the animal or animals imprisoned in the compartment $A^3$ may be hidden from an animal entering the compartment $A^2$. The top of the compartment $A^3$ is preferably covered with wire mesh $A^4$ so as to permit the ready inspection of said compartment. This wire mesh also preferably extends over the rear end of the compartment $A^2$, an opening being cut therethrough, closed by the door C, and the said wire mesh is carried up to the front over the arc-shaped casing $A^5$ provided at the top of the front end of the trapping compartment.

Journaled in this casing $A^5$, and concentric therewith, is a segmental wheel D which is formed of two side boards or plates $D'$, connected together on the periphery by the transverse rods $d$. This segmental wheel is pivoted on the pin or shaft E, and to prevent the parts from binding, and to permit the wheel to turn freely on said pin, suitable spacing washers $e$ are provided. The wheel with the parts carried thereby is nicely balanced so that it may be readily turned from the position shown in Fig. 4 to that shown in Fig. 5, or vice versa.

Pivoted on the pin $f$ connecting the opposite sides $D'$ of the wheel D is the pedal F which forms a gangplank on which the animal places his feet when he reaches for the bait. The bait G may be suspended from a hook H carried by the segmental wheel, or it may be attached to a suitable hook I mounted in the housing J projecting upwards inside of the wheel. Obviously two different kinds of bait may be used, or other bait holding attachments may be provided as desired.

Attached to the segmental wheel near the rear end thereof are the connecting rods or wires K, which are pivoted, as at $k$, to the re-setting pedal M which is pivoted, as at $m$, in the bottom of the box, as shown most clearly in Figs. 4 and 5.

The partition $A'$ is preferably made opaque, as previously described, but the door B is preferably made of wire mesh so that the animal caught in the trap will tend to push his way into the waiting room, as animals when imprisoned will attempt to escape towards the light.

The operation of the device is as follows:

Suppose the trap to be empty and to be baited, as shown in Fig. 4, with one or more baits, the animal smelling the bait will place his front feet on the pedal F and its weight will cause the segmental wheel to swing to the left, the parts then assuming the position shown in Fig. 5. This will imprison the animal in the wheel, and finding that he cannot back out he will move ahead, and passing through the open end of the wheel he will place his feet on the pedal M; this will cause the nicely balanced wheel to swing from the position shown in Fig. 5 back to the position shown in Fig. 4, and the animal will be imprisoned in the rear end of the trapping compartment A³. In attempting to escape from this compartment he will push open the swinging door B and will enter into the waiting room A³, the door B closing behind him.

The trap will now be re-set with the trapping compartment entirely empty and the animals previously caught all held in the waiting room A³.

When it is desired to remove the animals imprisoned in the trap these may be allowed to escape alive by turning the trap so that it will rest on the side A⁶. This will permit the door B to swing open by gravity, and then if the door C be opened the animals can very readily escape into the open, to be caught by dogs, or they may be caught in larger receptacles and carried off if desired.

Instead of allowing the animals to escape alive, the trap and its contents may be immersed in water, thus drowning the animals and at the same time cleansing the trap.

While I have shown the trap as made partly of wood and wire mesh, it may be made wholly of metal, including metal side plates and partitions, and wire mesh on top, or it may be made wholly of wire mesh, as such changes in material would involve mere mechanical skill and would come within the scope of my invention.

These and other changes could be made without departing from the spirit of my invention; and I do not mean to be limited to such details except as particularly pointed out in the claims.

Having thus described my invention what I claim and desire to secure by Letters Patent of the United States is:—

1. An animal trap comprising a box divided into two compartments, a trapping compartment and an imprisoning compartment, with a gravity closing swinging door opening from the first compartment into the second, a segmental wheel provided with two parallel sides pivoted in the trapping compartment, means for supporting a bait mounted in said wheel, an admission pedal pivoted to said wheel, projecting outward, a re-setting pedal pivoted towards the rear portion of said trapping compartment opposite said door, and links connecting said re-setting pedal and the rear edge of said wheel, substantially as described.

2. An animal trap comprising a box divided into two compartments, a trapping compartment open at the front end, and an imprisoning compartment, with a one-way passage for the animal connecting the first compartment with the second, a segmental wheel provided with a closed top and an open bottom and two parallel sides pivoted in the trapping compartment, means for supporting a bait mounted in said trapping compartment, an admission pedal pivoted to said wheel, projecting outward, a re-setting pedal pivoted in the rear portion of said trapping compartment, and links connecting said re-setting pedal and the rear edge of said wheel, substantially as described.

3. An animal trap comprising a box divided into two compartments, with an opaque partition separating said compartments, said partition being provided with a doorway, near the rear end thereof, the said compartments comprising a trapping compartment open at one end, and a closed imprisoning compartment, with a gravity closing swinging grated door opening from the first compartment into the second, a segmental wheel provided with two parallel sides pivoted in the trapping compartment, means for supporting a bait mounted in said wheel, an admission pedal pivoted to said wheel, projecting outward, a re-setting pedal pivoted towards the rear portion of said trapping compartment opposite said door, and links connecting said re-setting pedal and the rear edge of said wheel, substantially as described.

RIVERS D. OLHAUSEN.